Figure 1:
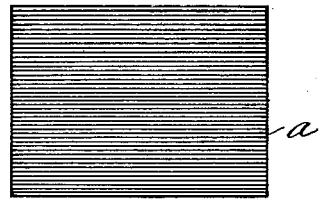
Figure 1:
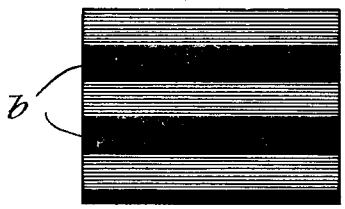
Figure 1:
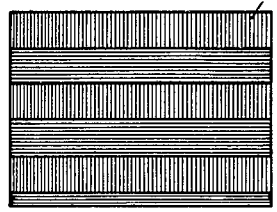
Figure 1:
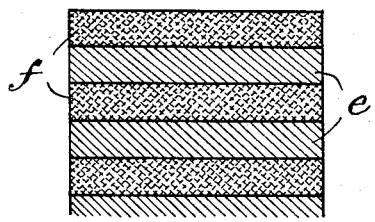
Figure 1:
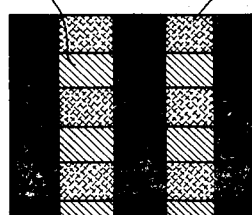
Figure 1:
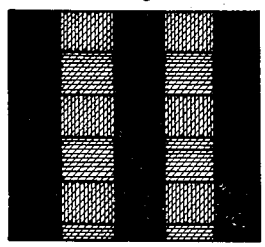
Figure 1:
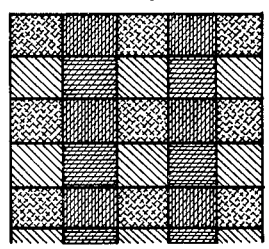
Figure 1:
Figure 1:
Figure 1:
Figure 1:
Figure 1:
Figure 1:
Figure 1:

Sept. 1, 1925.                                                            1,552,126
L. DUFAY
METHOD OF MANUFACTURING POLYCHROME SCREENS FOR COLOR PHOTOGRAPHY
AND CINEMATOGRAPHY
Filed April 22, 1924

*Fig.2.*      *Fig.3.*

*Fig.4.*      *Fig.5.*

*Fig.6.*      *Fig.7.* blue        red         orange green      red + violet    blue + violet violet

Inventor
L. Dufay
By Marks & Clark
Attys.

Patented Sept. 1, 1925.

1,552,126

UNITED STATES PATENT OFFICE.

LOUIS DUFAY, OF VERSAILLES, FRANCE.

METHOD OF MANUFACTURING POLYCHROME SCREENS FOR COLOR PHOTOGRAPHY AND CINEMATOGRAPHY.

Application filed April 22, 1924. Serial No. 708,254.

*To all whom it may concern:*

Be it known that I, LOUIS DUFAY, a citizen of the French Republic, residing at 10 Rue Champ-Lagarde, Versailles, Seine-et-Oise, France, have invented new and useful Improvements in the Methods of Manufacturing Polychrome Screens for Color Photography and Cinematography, of which the following is the specification.

The colored selecting net works or screens adapted for color photography have been obtained up to the present time by means of colored elements, grains of fecula, greasy ink, gelatin, celluloid, gum, etc., regularly arranged or distributed on a transparent support or carrier, of glass or celluloid. These colored elements forming a mosaic work, constitute therefore, a special layer which is caused to adhere to the transparent support by suitable means, such as glue, impression, etc.

It has also been proposed to obtain polychrome screens by placing greasy reserves on the transparent support and then coloring the uncovered part of said support. The whole is then coated with a varnish, the character of which is such as to permit the removal or elimination of the reserves originally applied, and then the parts of the support already colored are protected by this varnish.

The elimination of the first reserves then permits the coloring of the parts of the film which the varnish does not cover. As it is necessary in obtaining very small colored elements, to bring the greasy reserves very close to each other, their elimination or removal, without damaging the varnish, would be very difficult, and would always produce partial breaks or complete elimination of these greasy elements.

It has also been proposed to apply greasy reserves on a transparent support with a complementary color, said reserves permitting the de-coloration of the non-protected parts and their coloring with another complementary color. This method results only in a three colored screen and the elements of the same color do not cover the same total surface as the elements of another color. The screen would not, hence, be homogeneous from a chromatic point of view.

The present invention has for its object, a four-color polychrome screen which is characterized in that there are applied on a transparent support, coated with a primary color, greasy reserves, so as to permit de-colorizing the parts not covered by the reserves, and then coloring said parts with another primary color. After eliminating the greasy reserves, the two primary color screen thus obtained, is colored over its entire surface, with a third primary color, thus resulting in a screen of two complementary colors. On this screen I apply greasy reserves and eliminate the third primary color on the parts which are not covered by the greasy reserves. In these parts, I then cause the two first primary colors to re-appear, and I color these latter with a complementary color of the third primary color used. After eliminating the reserves, I obtain a screen of four complementary colors.

The first group of colors may be constituted by red and yellow and the second group by blue and its complementary color, orange. Or if desired, the first group may be yellow and blue and the second group be red and its complementary color green. Furthermore, the colored elements may be of any shape, geometrical or not, regular or irregular.

In case it is desired to obtain the particular chromatic system; blue and red, yellow and violet, the process consists of the series of steps illustrated diagrammatically in Figs. 1 to 7 of the accompanying drawings.

One face of a transparent support, such as a sheet of film or glass *a* will be uniformly coated in blue for instance (Fig. 1). Then it will receive, after this coating, the typographic impression of a series of lines *b* of greasy ink (Fig. 2). This series of fatty or greasy lines will form reserves which only partially cover the coated surface of the transparent support, so that I can eliminate or remove the blue coat from the parts not covered by the reserves *b*. After the blue is removed from these sections, I coat these parts with another primary color *d*, red for example. The reserves *b* are then eliminated or removed and I thus obtain a screen in two primary colors, red and blue stripes in this instance, (see Fig. 3).

The removal of the blue between the reserves, that is, from the parts not occupied by the reserves, may be accomplished by using potassium hydrate or sodium hydrate.

This de-colorant may be added to the red which is substituted for the blue.

The substitution of the red dye stuff or color for the blue will be effected nearly instantaneously by adding to the red, a small proportion of an alkali-sodium hydrate or potassium hydrate.

This surface which now consists of alternate red and blue stripes is then coated with an alcoholic solution of yellow dye stuff or color which will convert the blue into green *e* and the red into orange *f* (Fig. 4).

Then on the screen thus prepared, I typographically print a new series of greasy lines *c* which cross the green and orange lines at any suitable angle (Fig. 5).

Then the surface thus treated is subjected to the action of a blue-violet coloring bath of such chemical nature that it destroys the yellow and takes its place in the portions not protected by the greasy ink, which alone, will be pervious (Fig. 6). In the non-protected portions, the sub-adjacent red and blue divisions will persist after elimination of the yellow and will reinforce the selecting power of the blue-violet, without modifying their own selection or absorption bands.

There will then only remain the elimination of the series of greasy lines, and the network, thus produced will be incorporated and impermeabilized in the mass of the transparent support or base, without any black or colorless space, and will present selecting elements colored green, orange, violet-blue and violet-red (Fig. 7).

This network or screen can be used for all photographic and cinematographic uses and may be emulsified in the ordinary manner.

Of course, the combination of dye stuffs or colors can be varied, and instead of a series of greasy lines for reserves, I may use as reserves, figures, either geometrical or not, and regular or irregular.

What I claim as my invention and desire to secure by Letters-Patent is:

1. In a method of manufacturing polychrome screens for cinematography, coating one face of a transparent support with a primary color, placing greasy reserves on said colored surface, eliminating said primary color from the parts of the support not covered by the reserves, then coloring with another primary color the parts of the support not covered by the reserves, and then eliminating the reserves to obtain a screen of two primary colors.

2. In a method as claimed in claim 1, eliminating the first mentioned primary color on the parts of the support not protected by the reserves, by the use of an alkali.

3. In a method as claimed in claim 1, the added step of coating the entire surface of the two color screen with a third primary color to obtain a screen of two complementary colors.

4. In a method as claimed in claim 1, the added step of coloring the entire surface of the two color screen with a third primary color to obtain a screen of two complementary colors, and then applying greasy reserves on the screen of two complementary colors.

5. A method of manufacturing polychrome screens for color photography consisting in coating a transparent sheet with a primary color, placing greasy reserves on said coating, using an alkali to eliminate said primary color on the parts of the sheet not covered by the reserves, then coloring with another primary color, the parts of the sheet from which said primary color has been eliminated, then removing the reserves to obtain a screen of two primary colors, then coating the entire surface of the two color screen with a third primary color to obtain a screen of two complementary colors, applying a second series of fatty reserves on the screen of two complementary colors, and then eliminating the third primary color in the parts not covered by the second series of reserves to cause the first two primary colors to reappear.

6. A method as claimed in claim 5 in which the third primary color in the parts not covered by the second series of reserves is eliminated by the use of an alkali.

7. A method as claimed in claim 5 in which the parts not covered by the second reserves are colored with a fourth color complementary to the third color used, and finally eliminating the second series of greasy reserves to obtain a screen of four complementary colors.

In testimony whereof I have signed my name to this specification.

LOUIS DUFAY.